(12) United States Patent
Dougherty et al.

(10) Patent No.: US 7,810,160 B2
(45) Date of Patent: *Oct. 5, 2010

(54) COMBINING COMMUNICATION POLICIES INTO COMMON RULES STORE

(75) Inventors: Jesse M. Dougherty, Kirkland, WA (US); Malcolm E. Pearson, Kirkland, WA (US); Shawn M. Thomas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1275 days.

This patent is subject to a terminal disclaimer.

(21) Appl. No.: 11/320,348

(22) Filed: Dec. 28, 2005

(65) Prior Publication Data

US 2007/0150933 A1 Jun. 28, 2007

(51) Int. Cl.
G06F 7/04 (2006.01)
(52) U.S. Cl. .................. 726/26; 713/166; 713/167
(58) Field of Classification Search .............. 380/44; 713/189; 726/2, 22
See application file for complete search history.

(56) References Cited

U.S. PATENT DOCUMENTS

| | | | |
|---|---|---|---|
| 5,872,930 | A | 2/1999 | Masters et al. |
| 6,073,142 | A | 6/2000 | Geiger et al. |
| 6,421,709 | B1 | 7/2002 | McCormick et al. |
| 6,678,828 | B1* | 1/2004 | Pham et al. ............ 726/2 |
| 6,760,420 | B2 | 7/2004 | Heilmann et al. |
| 6,826,609 | B1 | 11/2004 | Smith et al. |
| 6,868,498 | B1 | 3/2005 | Katsikas |
| 6,907,461 | B2 | 6/2005 | Ishmael, Jr. et al. |
| 6,925,488 | B2 | 8/2005 | Bantz et al. |
| 6,931,532 | B1* | 8/2005 | Davis et al. ............ 713/167 |
| 6,941,459 | B1* | 9/2005 | Hind et al. ............. 713/167 |
| 6,947,951 | B1 | 9/2005 | Gill |
| 6,957,358 | B1 | 10/2005 | Sundaresan et al. |
| 6,961,849 | B1* | 11/2005 | Davis et al. ............ 713/167 |

(Continued)

FOREIGN PATENT DOCUMENTS

EP    1 143 665 A2    10/2001

(Continued)

OTHER PUBLICATIONS

Cisco Systems, *Cisco AON: A Network-Based Intelligent Message Routing System*, http://www.cisco.com/en/US/products/ps6438/products_data_sheet0900aecd802c1f9c.html, 2005, 5 pp.

(Continued)

*Primary Examiner*—Pramila Parthasarathy
(74) *Attorney, Agent, or Firm*—Senniger Powers LLP (57) ABSTRACT

A method for applying a common communication policy over at least two user groups of an organization. The method receives a communication request to transmit a communication between a sender user and at least one recipient user. The method identifies characteristics of the sender user and identifies characteristics of the at least one recipient user. The method further accesses a communication rules store common to the at least two user groups and determines the communication rules in the rules store applicable to the received communication based upon at least one of the characteristics of the sender user, the characteristics of the at least one recipient user, and the content of the communication. The method applies the identified rules to the communication.

18 Claims, 3 Drawing Sheets

U.S. PATENT DOCUMENTS

| | | | |
|---|---|---|---|
| 6,978,367 B1 * | 12/2005 | Hind et al. | 713/167 |
| 7,181,017 B1 * | 2/2007 | Nagel et al. | 380/282 |
| 7,340,438 B2 * | 3/2008 | Nordman et al. | 705/64 |
| 7,522,908 B2 * | 4/2009 | Hrastar | 455/411 |
| 7,613,659 B1 * | 11/2009 | Hoffman et al. | 705/44 |
| 2002/0048369 A1 * | 4/2002 | Ginter et al. | 380/277 |
| 2002/0099823 A1 | 7/2002 | Jemes et al. | |
| 2002/0103866 A1 | 8/2002 | Chi et al. | |
| 2002/0129345 A1 | 9/2002 | Tilden et al. | |
| 2003/0028580 A1 | 2/2003 | Kucherawy | |
| 2003/0050911 A1 | 3/2003 | Lucovsky et al. | |
| 2003/0149888 A1 * | 8/2003 | Yadav | 713/200 |
| 2003/0196116 A1 | 10/2003 | Troutman | |
| 2004/0059789 A1 | 3/2004 | Shum | |
| 2004/0073617 A1 | 4/2004 | Milliken et al. | |
| 2004/0109518 A1 * | 6/2004 | Miller et al. | 375/356 |
| 2004/0162741 A1 | 8/2004 | Flaxer et al. | |
| 2004/0177120 A1 | 9/2004 | Kirsch | |
| 2005/0015264 A1 | 1/2005 | Mutchler | |
| 2005/0021622 A1 | 1/2005 | Cullen | |
| 2005/0055578 A1 | 3/2005 | Wright et al. | |
| 2005/0081059 A1 | 4/2005 | Bandini et al. | |
| 2005/0097170 A1 | 5/2005 | Zhu et al. | |
| 2005/0149573 A1 | 7/2005 | Serrano-Morales et al. | |
| 2005/0198098 A1 | 9/2005 | Levin et al. | |
| 2005/0228867 A1 | 10/2005 | Osborne et al. | |
| 2005/0256931 A1 | 11/2005 | Follmeg et al. | |
| 2006/0253597 A1 | 11/2006 | Mujica | |
| 2008/0060080 A1 * | 3/2008 | Lim | 726/26 |

FOREIGN PATENT DOCUMENTS

| | | |
|---|---|---|
| WO | 0127772 A1 | 4/2001 |
| WO | WO 2005/020527 A1 | 3/2005 |

OTHER PUBLICATIONS

Sun Microsystems, Chapter 5 Deployment Design, Online, Feb. 2005, Retrieved Jul. 2009, http://web.archive.org/web20050219003745/http://docs.sun.com/sourcce/819-0058/dep_archetect.html, pp. 1-22.

Cuervo, F. et al., "Prime Time for Policy-Based Management", Alcatel Telecommunications Review, Alcatel, Paris Cedex, FR, Jul. 2003, XP007005947, ISSN: 1267-7167, 9 pgs.

* cited by examiner

COMBINING COMMUNICATION POLICIES INTO COMMON RULES STORE

BACKGROUND

Large organizations, such as corporations and governmental entities, often are comprised of many users and user groups. These users and user groups may be spread over large physical spaces, or geographic areas, such as in different buildings in the same city, different cities in the same country or region, and even in different countries. Moreover, such users and user groups may also be separated by subject matter, such as different departments in the same or different facilities.

Practicing messaging governance over such dispersed user groups can be difficult. Many considerations contribute to a comprehensive communications policy, including risk management, compliance with organizational norms, human resources considerations, security issues, regulatory issues, operational policies, and best practices guidelines, to name a few. Moreover, each geographically distinct and/or subject matter distinct group typically operates its own messaging server separate from the other groups. Moreover, each distinct group may be governed by different a communication policy, which is typically stored on the respective messaging server of the group. Thus, each user group often follows a different communication policy, without knowledge of the communication policy of other groups within the organization. Each messaging server relies upon its own store of communication rules, while other groups are responsible for the maintenance and application of their own rules.

Such communication policies may be developed on a group-by-group basis, whereby a communication decision-maker (e.g., a corporate security officer) for each group must communicate the policies of the group to a systems professional of the group for implementation over the messaging of the group members. This communication process is time-consuming and can cause difficulties as the systems professional must transform the rules and policies of the communication decision-maker into tangible, executable rules suitable for execution by the messaging server.

These conventional systems are effective at enforcing communication policies within a user group of the organization, but are often redundant, wasteful of resources, and may be contradictory. A way to successfully implement a common communication policy over several related user groups belonging to the same organization, while providing individual communication decision-makers from each group of the organization some control of the communication policies of their group would be useful.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, methods and systems for applying communication policies over more than one group of an organization are disclosed. These methods and systems comprise accessing a common store of communication rules so that each group has access to the same rules, determining the applicable rules, and applying the applicable rules to messaging of the organization.

BRIEF DESCRIPTION OF THE DRAWINGS

Corresponding reference characters indicate corresponding parts throughout the drawings.

DETAILED DESCRIPTION

Systems for Managing Message Flow

A system, generally indicated 21, for managing the flow of messages between multiple users 23 belonging to different groups of an organization is disclosed. Such a system 21 is particularly useful in implementing a messaging system, such as an electronic-mail, instant messaging, file transfer protocol, or telephony system, over a large organization. Such organizations often have multiple users and multiple user groups that may be spread over a large geographic area, as well as over different areas of subject matter.

Figure 1:
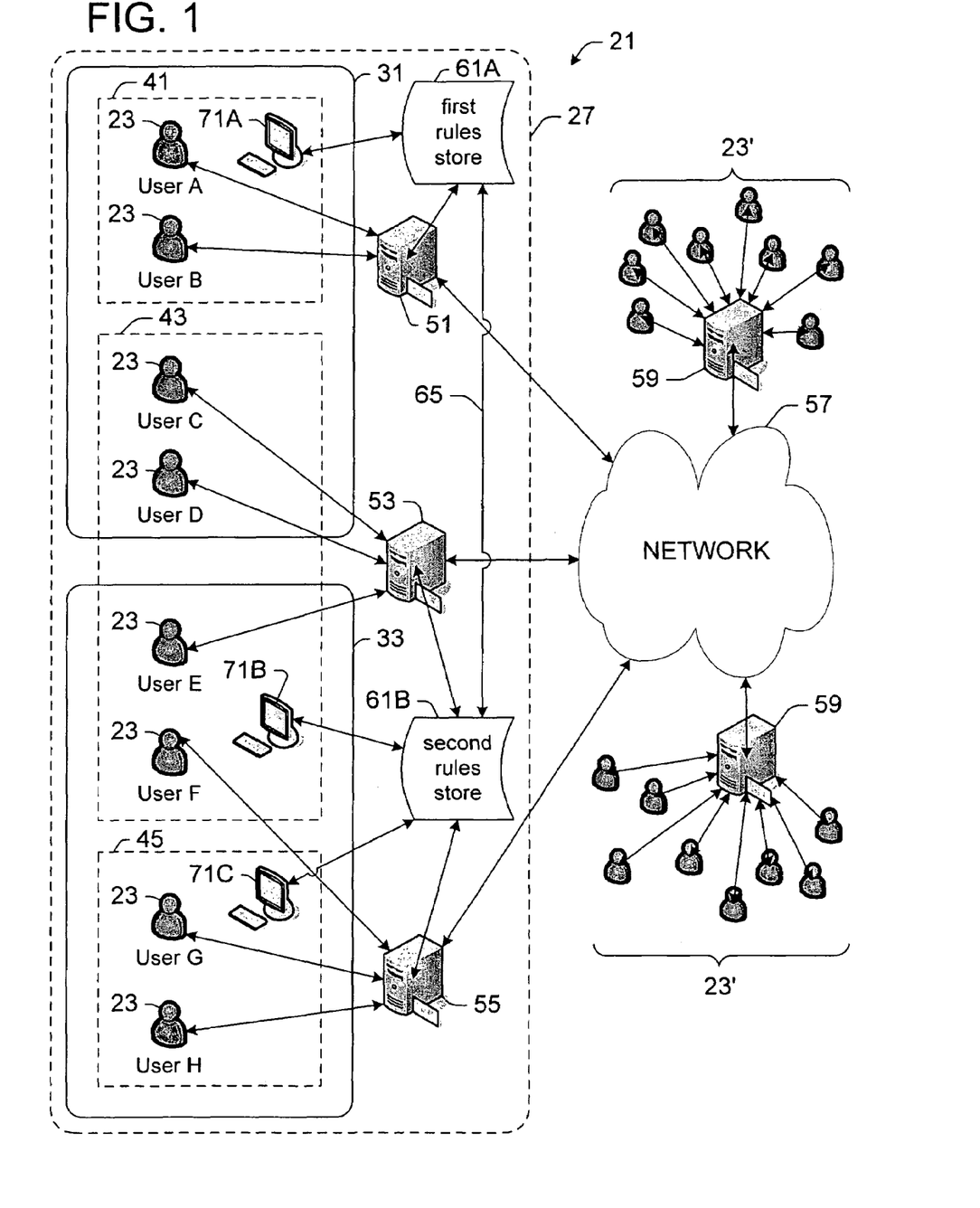
FIG. 1 is a diagram of a system of one embodiment of the present invention.

Referring now to the exemplary embodiment of FIG. 1, several users 23 are each members of an overarching organization 27. Users A-H 23 are each designated by two attributes, their physical location and their sub-organization, or group, within the organization 27. In this embodiment, the users 23 are divided between two physical locations: a first physical location 31 and a second physical location 33. As would be readily understood by one skilled in the art, any number of additional physical locations may be added without departing from the scope of the embodiments of the present invention. Moreover, the users 23 are also divided into groups (e.g., based upon subject matter or specialty), or sub-organizations, of the general organization 27. In particular, three user groups of the organization 27 are depicted, a first group 41, a second group 43, and a third group 45. As will be discussed in detail below, it should be noted that the physical locations 31, 33 and the groups 41, 43, 45 are not necessarily coextensive with respect to the users.

For example, user A and user B are each housed in the same first physical location 31 and are members of the same first group 41. A first messaging server 51 provides communication services (e.g., message routing, reception, retrieval, archiving, etc.) to both user A and user B. As would be readily understood by one skilled in the art, any number of other users 23 like user A and user B (housed in the first physical location 31 and members of the first group 41) may also be serviced by the first messaging server 51 without departing from the scope of the embodiments of the present invention.

Referring again to FIG. 1, users C, D, E, and F are each members of the same second group 43. The users 23, however, are housed in different physical locations. In particular, user C and user D are each housed in the first physical location 31, while user E and user F are each housed in the second physical location 33. The first physical location 31 and the second physical location 47 may be separated by small or large distances, without departing from the scope of the embodiments of the present invention. A second messaging server 53 provides communication services to user C, user D, and user E. As would be readily understood by one skilled in the art, the second messaging server 53 is capable of providing communication services to users 23 located in different physical locations (e.g., the first physical location 31 (e.g., user C and user D) and the second physical location 33 (e.g., User E)). This exemplary embodiment demonstrates that a single messaging server may provide communication services to users in different physical locations, yet belonging to the same group of the organization.

In another exemplary arrangement of users 23 depicted in FIG. 1, the second group 43 further comprises user F, also located in the second physical location 33. Although user F and user E share the same group (the second group 43) and location (the second physical location 33), different messaging servers provide their communication services. In particular, the second messaging server 53 provides communication services to user E, while a third messaging server 55 provides communication services to user F. The third messaging server 55 also provides communication services to user G and user H, who share the second physical location 33 with user E and user F, but are part of a third group 45, different from the first group 41 and the second group 43. This example demonstrates that a single messaging server may provide communication services to users in different groups of an organization, yet residing in the same physical location. Although not depicted in FIG. 1, a messaging server could also be configured to provide communication services to users not sharing a physical location or a subject matter group, such as a messaging server providing communication services to Users A, B, G, and H (not shown). The embodiments of the present invention may be adapted to any number of configurations suitable for the particular messaging and organizational environment.

The messaging servers 51, 53, 55 each communicate with a network 57, such as the World Wide Web, for communicating outside the organization 27. The network 57 communicates with other messaging servers 59 providing communication services to other users 23'. As used herein, messages between users 23 within the organization 27 are internal, and messages between users 23 within the organization 27 and users 23' outside the organization are external, because one of the parties to the communication is not a user in the organization. The relationship between the organization 27, the network 57, and the users 23' will not be discussed in greater detail here, as the relationship would be readily understood by one skilled in the art.

The system 21 further comprises a common rules store 61 separate from the first, second, and third messaging servers 51, 53, 55. The common rules store 61 is adapted to store a plurality of rules applicable to all of the users A-H. The first, second, and third messaging servers 51, 53, 55 are adapted to access the rules store 61 and utilize the stored rules to manage the flow of messages to and from each respective messaging server. The common rules store 61 provides a common entry point for evaluation and updating of rules, as will be discussed in greater detail below. Moreover, the common rules store 61 eliminates the need for active rules distribution throughout the organization 27, but rather acts as a centralized repository for control-aware messaging servers 51, 53, 55 designed to access the rules store 61 each time rules are required, thereby obtaining the latest version of the rules.

As shown in the embodiment of FIG. 1, the rules store 61 may comprise one or more stores having identical copies of the stored rules, such as the first rules store 61A and the second rules store 61B. These rules stores 61A, 61B communicate with one another via connection 65, or any suitable network, whereby a change applied to one rules store is applied to the other rules store. In this manner, both rules stores 61A, 61B are maintained as identical, such that any messaging server 51, 53, 55 accessing any rules store 61A, 61B accesses the same set of rules. Having more than one copy of the rules store 61A, 61B may be helpful where different messaging servers are located at different locations (e.g., the first messaging server 51 and the third messaging server 55).

The system 21 further comprises one or more user interfaces 71 whereby a communication decision-maker may review the rules of the rules store 61 and modify rules of the rules store to control the flow of messages, without reviewing the individual messages. For example, the first group 41 comprises a first user interface 71A in communication with the first rules store 61A for reviewing the rules store and modifying the rules store by the communication decision-maker. Similarly, the second group 43 comprises a second user interface 71B in communication with the second rules store 61B for reviewing the rules store and modifying the rules store by the communication decision-maker. Similarly, the third group 45 comprises a third user interface 71C in communication with the second rules store 61B. With such user interfaces 71A, 71B, 71C, the communication decision-makers are able to review and modify the rules of the rules store to implement communication policies of the general organization 27 and the respective groups 41, 43, 45.

In still another alternate embodiment, one or more of the messaging servers 51, 53, 55 may operate in a language different from the other messaging servers. The rules store, however, is stored in a common, generic format such that messaging servers operating in a different language from one another may access the rules store and use the rules. In particular, one common rule format may be defined that is sufficiently expressive to cover the many intended outcomes of the communications policy administrator. A translation is then defined from the common rule format to the particular format applied in an individual application. For example, the generic rule might allow set matching (e.g., sender is in set {A, B, C, D}), whereas a particular system may only support rules invoking an individual match (e.g., sender is A, or sender is B, or sender is C, or sender is D). In this example, there is a clear transformation between these languages.

Because each of the messaging servers 51, 53, 55 has access the same rules store 61A, 61B, one messaging server is adapted to access rules in the rules store established by a communication decision-maker associated with another group of the organization 27. Therefore, the rules established by one communication decision-maker acting on behalf of one group (e.g., the first group 41) are applied to other groups (e.g., the second and third groups 43, 45) via the common rules store 61A, 61B.

Methods

Figure 2:
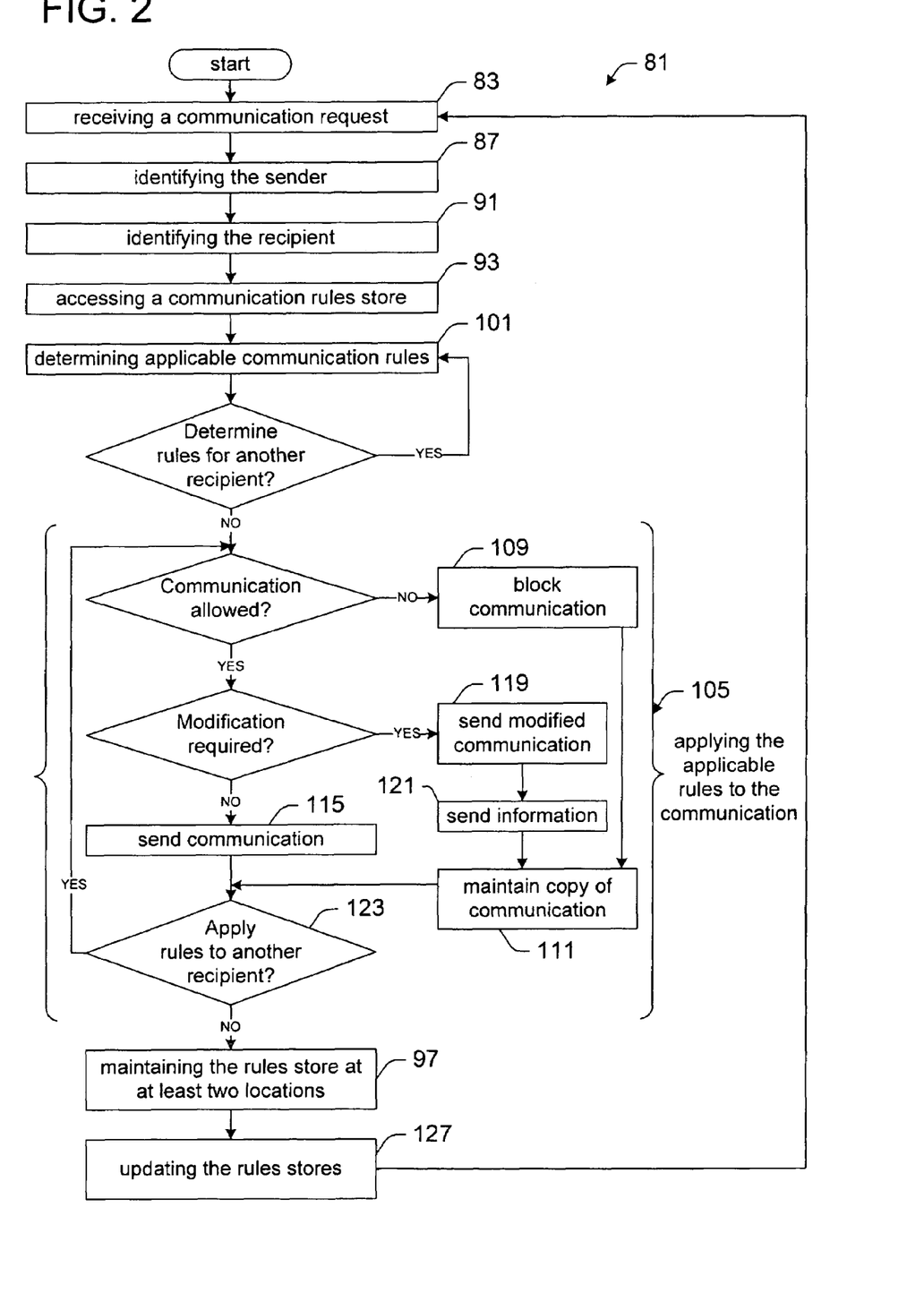
FIG. 2 is a flow diagram of a method of one embodiment of the invention.

A method for applying a common communication policy over at least two user groups of an organization, such as the user groups and organization discussed above with respect to FIG. 1, is generally indicated 81 in FIG. 2. The method 81 comprises receiving, at 83, a communication request to transmit a communication between a sender user and at least one recipient user, wherein at least one of the sender user and the recipient user is a user in one of the at least two user groups. Such a communication request may be received by a messaging server like those discussed above, for example, which could execute the commands of the following method 81. Such communications can include, but are not limited to, e-mail messages, instant messaging messages, and file transfer protocol messaging.

The method 81 further comprises identifying, at 87, characteristics of the sender user. Those characteristics may include the identity of the sender user, the identity of the user group in which the sender user is a member, the position of the sender user, and the relationship between the sender user and the recipient user. Such information can often be readily ascertained according to the present method by accessing existing data stores, such as organizational directories and charts. The method 81 may also comprise identifying, at 91, characteristics of the at least one recipient user. Those characteristics may include the identity of the at least one recipient user, the identity of the user group in which the at least one recipient user is a member, the position of the recipient user, and the relationship between the recipient user and the sender user. Other characteristics may also be identified, as required by a particular communication decision-maker for a particular group of users. Any characteristic associated with the contents of the communication, the sender user, or the recipient user(s) may be identified without departing from the scope of the embodiments of the present invention. Although many characteristics may be identified, it should be understood by one skilled in the art that not all of these characteristics must be identified for each communication, and that if more than one characteristic is identified, different uses and relative weights may be applied among the different characteristics to adjust the relative impact of each.

The method 81 also comprises accessing, at 93, a communication rules store common to the at least two user groups. In one alternative embodiment, as depicted in FIG. 1, the method may further maintain, at 97, the rules store at at least two locations, whereby the user group accessing the rules store may access the rules at at least one of the at least two locations.

The method 81 further determines, at 101, the communication rules in the rules store applicable to the received communication based upon at least one of the characteristics of the sender user, the characteristics of the at least one recipient user, and the content of the communication. The content of the communication may encompass any number of characteristics of the communication. In one alternative embodiment, the content of the communication comprises at least one of the message header, the message body, and attachments to the message. Other characteristics of the communication may be utilized to determine applicable communication rules without departing from the scope of the embodiments of the present invention. In an alternative embodiment with more than one recipient user, it may be determined 101 that one or more rules apply to one recipient user and that one or more other rules apply to another recipient user. For example, the method may determine 101 if the communication contains forbidden items (e.g., objectionable language, inappropriate project names or descriptors, etc.) or exceeds a size limit (e.g., large attachments).

Once the applicable rules are determined 101, the method 81 additionally applies, generally indicated 105, the applicable rules to the communication. For example, if the rules do not allow such a communication, the communication is blocked, at 109. The communication may be blocked for any number of reasons, including objectionable content and inappropriate contact between parties, among others. In one exemplary embodiment where such a communication is blocked 109, a copy of the blocked communication is maintained, at 111, for review by a communication decision-maker.

Conversely, if the communication rules allow such a communication without modification due to the applicable rules, then the communication is sent, at 115, to the at least one recipient user. In one alternative embodiment where the rules require a modified communication, the modified communication is sent, at 119, to the at least one recipient user with modifications to one or more of the message header, the message body, or the message attachments. In another alternative embodiment, the recipient user of the communication itself may be modified, such as rerouting an inappropriate message to supervisory personnel, rather than the intended recipient user. In one alternative embodiment, sending 119 the modified communication triggers maintaining, at 111, a copy of at least one of the communication (e.g., for archival purposes) and the modified communication for review by a communication decision-maker. Moreover, in another alternative embodiment, sending the modified communication may additionally comprise sending, at 121, information with the modified communication to at least one of the sender user and the recipient user regarding at least one of the modifications applied to the modified communication and the communication rule requiring such a modification to the communication. This information can serve any purpose, such as educational, explaining what rules required modification of the communication.

The method may further comprise applying, at 123, different rules to another recipient user if it is determined that one recipient user may have different applicable rules than another recipient user. For example, the applying 105 the applicable rules to the communication may comprise applying one of (i) sending 115 the communication to one recipient user if the rules allow such a communication, (ii) sending 119 a modified communication to the one recipient user if the rules require such a modified communication, and (iii) blocking 109 the communication to the one recipient user if the rules do not allow such a communication to one recipient user. Moreover, the applying 105 may also comprise applying one of (i) sending 115 the communication to the another recipient user if the rules allow such a communication, (ii) sending 119 a modified communication to the another recipient user if the rules require such a modified communication, and (iii) blocking 109 the communication to the another recipient user if the rules do not allow such a communication to the another recipient user. Because each of the recipient users is treated individually, the method 81 may send 119 one modified communication to one recipient user and send another modified communication to another recipient user, the one modified communication and the another modified communication being different from one another.

In another alternative embodiment, when applying 105 the applicable communication rules to the communication, the more-restrictive rules are applied before applying the less-restrictive rules. For example, this could comprise applying 105 the rules blocking 109 communications before the rules modifying 119 communications. In this manner, if the communication is blocked 109, there is no need to apply the modification rules to a message that will ultimately be blocked.

The method 81 may additionally update, at 127, both rules stores with at least one of rule changes, rule additions, and rule deletions simultaneously, whereby both stores provide access to the same updated set of rules. In one alternative embodiment, the updating 127 comprises receiving at least one of policy changes, policy additions, and policy deletions from a communication decision-maker and creating rule changes, rule additions, and rule deletions based upon the policy changes, additions, and deletions of the communication decision-maker. In one alternate embodiment, the method receives the policy changes, policy additions, and policy deletions in a natural language from the communication decision-maker. This allows a lay communication decision-maker to provide communication rules in a non-technical language (e.g., marketing employees cannot communicate with purchasing employees), making rules submission simpler and more reliable. In the alternative embodiment with more than one rules store, the updating 127 comprises updating both rules stores based upon instructions from a communication decision-maker.

In another alternative embodiment, a method, also depicted 81 in FIG. 2, applies a common communication policy to users belonging to an organization 27, such as the organization depicted in FIG. 1. The method 81 comprises receiving, at 83 a communication request to transmit a communication between a sender user and at least one recipient user. In the present method, users external to the organization may also be the sender user or the recipient user. The method further comprises identifying, at 87, the user group in which the sender user is a member. The sender user may be a member of a user group internal to the organization or external to the organization. The method further comprises identifying, at 91, the user group in which the at least one recipient user is a member. The recipient user may also be a member of a user group internal to the organization or external to the organization, as long as one of the sender user or recipient user is internal to the organization. The method 81 further comprises accessing, at 93, a communication rules store common to user groups internal to the organization to obtain rules. The method 81 further comprises determining, at 101, the communication rules in the rules store applicable to the received communication based upon whether the received communication is internal to the organization, passing from one internal user to another internal user, or external to the organization, including at least one user external to the organization. The method further comprises applying, at 105, the applicable communication rules to the communication. With this method, the source and destination of the communication contribute to the determination and application of communication rules from the common rules store.

In another alternative embodiment, when applying 105 the applicable communication rules to the communication, the more-restrictive rules are applied before applying the less-restrictive rules. For example, this could comprise applying 105 global rules relating to message content (e.g., objectionable materials) before applying the rules relating to the internal or external nature of the communication. In this manner, a clearly objectionable communication may be blocked or modified before determining if the communication is external or internal to the organization.

General Purpose Computing Device

Figure 3:
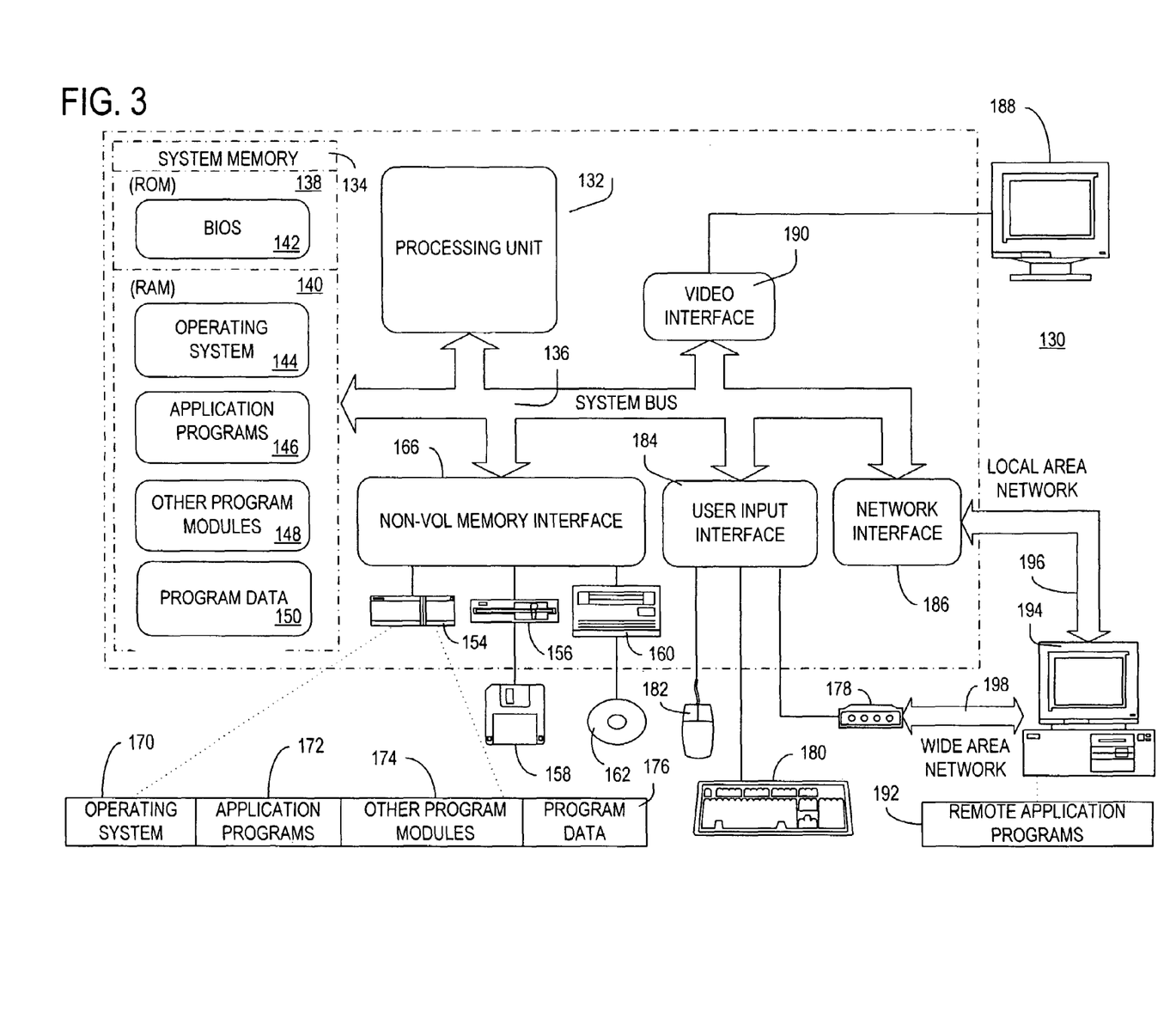
FIG. 3 is a block diagram illustrating one example of a suitable computing system environment in which one or more of the embodiments of the invention may be implemented.

FIG. 3 shows one example of a general purpose computing device in the form of a computer 130. In one embodiment of the invention, a computer such as the computer 130 is suitable for use in the other figures illustrated and described herein. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 3 illustrates operating system 144, application programs 146, other program modules 148, and program data 150.

The drives or other mass storage devices and their associated computer storage media discussed above and illustrated in FIG. 3, provide storage of computer readable instructions, data structures, program modules and other data for the computer 130. In FIG. 3, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown). In one example, the user interfaces discussed above may be embodied by such input devices and monitors.

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 3 illustrates remote application programs 192 as residing on the memory device. It will be appreciated that the network connections shown are exemplary and other means of establishing a communications link between the computers may be used.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the embodiments of the invention are operational with numerous other general purpose or special purpose computing system environments or configurations. The computing system environment is not intended to suggest any limitation as to the scope of use or functionality of the embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes a computer-implemented method of operation on one or more data processing devices such as described above for applying, by a computer, a common communication policy over at least two user groups of an organization. The computer 130 (or its components) receives a communication request to transmit a communication between a sender user and at least one recipient user, wherein at least one of the sender user and the recipient user is a user in one of the at least two user groups. The computer 130 (or its components) identifies characteristics of the sender user, including the identity of the sender user and the user group in which the sender user is a member. The computer 130 (or its components) identifies characteristics of the at least one recipient user, including the identity of the at least one recipient user and the user group in which the at least one recipient user is a member. The computer 130 (or its components) accesses a communication rules store common to the at least two user groups. The computer 130 (or its components) determines the communication rules in the rules store applicable to the received communication based upon at least one of the characteristics of the sender user, the characteristics of the at least one recipient user, and the content of the communication. The computer 130 (or its components) applies the applicable rules to the communication.

Also in operation, computer 130 executes a computer-implemented method of operation on one or more data processing devices such as described above for applying, by a computer, a common communication policy to users belonging to an organization. The computer 130 (or its components) receives a communication request to transmit a communication between a sender user and at least one recipient user. The computer 130 (or its components) identifies the user group in which the sender user is a member, wherein the user group is one of internal to the organization and external to the organization. The computer 130 (or its components) identifies the user group in which the at least one recipient user is a member, wherein the user group is one of internal to the organization and external to the organization. The computer 130 (or its components) accesses a communication rules store common to user groups internal to the organization. The computer 130 (or its components) determines the communication rules in the rules store applicable to the received communication based upon whether the received communication is internal to the organization or external-only to the organization. The computer 130 (or its components) applies the applicable communication rules to the communication.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A computerized method executable by a processor of a messaging server for applying a common communication policy over at least two user groups of an organization, said processor configured for:

receiving a communication from a sender user for transmission to at least one recipient user, wherein at least one of said sender user and said recipient user is a user in one of said at least two user groups;

identifying characteristics of the sender user, including the identity of the sender user and the user group in which the sender user is a member;

identifying characteristics of the at least one recipient user, including the identity of the at least one recipient user and the user group in which the at least one recipient user is a member;

accessing a communication rules store common to the at least two user groups, said communication rules store storing communication rules implementing a common communication policy, said communication rules store independent of the received communication from the sender user so that the communication rules are not part of or specified by the received communication;

selecting the communication rules in the rules store applicable to the received communication based upon at least one of the identified characteristics of the sender user, the identified characteristics of the at least one recipient user, and the content of the received communication; and applying the applicable rules to the communication, said applying comprising one of:
sending the communication to the at least one recipient user if the rules allow such a communication;
sending a modified communication to the at least one recipient user if the rules require such a modified communication; and
blocking the communication to the at least one recipient user if the rules do not allow such a communication.

2. The computerized method as set forth in claim 1 wherein said sending the modified communication further comprises maintaining a copy of at least one of the communication and the modified communication for review by a communication decision-maker, and
wherein said blocking the communication further comprises maintaining a copy of the blocked communication for review by a communication decision-maker.

3. The computerized method as set forth in claim 1 wherein said sending a modified communication further comprises sending information with the modified communication to the sender user and the recipient user regarding at least one of the modifications applied to the modified communication and the communication rule requiring such a modification to the communication.

4. The computerized method as set forth in claim 1 wherein said applying the applicable rules to the communication comprises applying the more-restrictive rules before applying the less-restrictive rules.

5. The computerized method as set forth in claim 1 wherein one or more rules of the selected rules apply to the at least one recipient user and one or more other rules of the selected rules apply to another recipient user.

6. The computerized method as set forth in claim 5 wherein said applying the applicable rules to the communication further comprises
applying one of (i) sending the communication to the another recipient user if the rules allow such a communication; (ii) sending a modified communication to the another recipient user if the rules require such a modified communication; and (iii) blocking the communication to the another recipient user if the rules do not allow such a communication to the another recipient user.

7. The computerized method as set forth in claim 1 wherein said characteristics of the sender user further include at least one of the position of the sender user and the relationship between the sender user and the recipient user,
wherein said characteristics of the recipient user further include at least one of the position of the recipient user the relationship between the recipient user and the sender user, and
wherein said selecting the communication rules applicable based upon the content of the communication comprises at least one of the message header, the message body, and attachments to the message.

8. The computerized method as set forth in claim 1 further comprising maintaining the rules store at least two locations, whereby the user group accessing the rules store may access the rules at least one of said at least two locations.

9. The computerized method as set forth in claim 8 further comprising updating both rules stores with at least one of rule changes, rule additions, and rule deletions simultaneously, whereby both stores provide access to the same updated set of rules.

10. The computerized method as set forth in claim 9 wherein said updating both rules stores comprises receiving at least one of policy changes, policy additions, and policy deletions from a communication decision-maker and
creating rule changes, rule additions, and rule deletions based upon said policy changes, additions, and deletions of the communication decision-maker.

11. The computerized method as set forth in claim 10 wherein said receiving comprises receiving said policy changes, policy additions, and policy deletions in a natural language.

12. The computerized method as set forth in claim 1 wherein said selecting the communication rules in the rules store applicable to the received communication comprises determining if the communication contains forbidden items or exceeds a size limit.

13. A system for managing the flow of messages between multiple users belonging to different user groups, said system comprising:
a first messaging server providing message communication services to a first group of users;
a second messaging server providing message communication services to a second group of users;
a common rules store separate from the first messaging server and the second messaging server, said common rules store adapted to store a plurality of rules applicable to both the first group of users and the second group of users, said first and second messaging servers being adapted to access the rules store and utilize the stored rules to manage the flow of messages to and from each respective messaging server by selecting applying the stored rules to received message communication, said first and second messaging servers further adapted to:
send the received message communication to at least one recipient user if the rules allow such a communication;
send a modified communication to the at least one recipient user if the rules require such a modified communication; and
block the received message communication to at least one recipient user if the rules do not allow such a communication,
wherein said common rules store is independent of said messages such that the plurality of rules are not part of or specified by said messages.

14. A system as set forth in claim 13 wherein said rules store comprises one or more stores having identical copies of the stored rules.

15. A system as set forth in claim 13 wherein said first messaging server operates in a first language and said second messaging server operates in a second language, said first messaging server and said second messaging server being adapted to access the same rules store.

16. A system as set forth in claim 13 further comprising a user interface whereby a communication decision-maker may review the rules of the rules store and modify rules of the rules store to control the flow of messages without reviewing the individual messages.

17. A system as set forth in claim 13 wherein said first messaging server is adapted to access rules in the rules store established by a communication decision-maker associated with the second group of users and said second messaging server is adapted to access rules in the rules store established by a communication decision-maker associated with the first group of users.

18. A computerized method executable by a processor of a messaging server for applying a common communication policy to users belonging to an organization, said processor configured for:
- receiving a communication from a sender user for transmission to at least one recipient user;
- identifying the user group in which the sender user is a member, wherein said user group is one of internal to the organization and external to the organization;
- identifying the user group in which the at least one recipient user is a member, wherein said user group is one of internal to the organization and external to the organization, wherein at least one of the sender user and the at least one recipient user is internal to the organization;
- accessing a communication rules store common to user groups internal to the organization, said rules store storing communication rules implementing a common communication policy, said communication rules store independent of the received communication so that the communication rules are not part of or specified by the received communication;
- selecting the communication rules in the rules store applicable to the received communication based upon whether the received communication is internal to the organization or external only to the organization; and
- applying the applicable communication rules to the received communication, said applying comprising one of:
  - sending the communication to the at least one recipient user if the rules allow such a communication;
  - sending a modified communication to the at least one recipient user if the rules require such a modified communication; and
  - blocking the communication to the at least one recipient user if the rules do not allow such a communication.

\* \* \* \* \*